United States Patent [19]

Lee et al.

[11] Patent Number: 4,785,513
[45] Date of Patent: Nov. 22, 1988

[54] TURRET HAVING ROTATING AND NON-ROTATING TOOLING

[75] Inventors: Richard C. Lee, Horseheads; Ivan R. Brown, Breesport; Kamalakar K. Rao, Elmira Heights; Joseph P. Waldron, Horseheads, all of N.Y.

[73] Assignee: Hardinge Brothers, Elmira, N.Y.

[21] Appl. No.: 942,310

[22] Filed: Dec. 16, 1986

[51] Int. Cl.$^4$ .................... B23B 29/32; B23B 39/20
[52] U.S. Cl. ...................... 29/40; 82/36 A; 408/35; 74/813 R; 74/825; 74/826
[58] Field of Search .................. 82/36 A; 408/35; 29/27 R, 27 C, 36, 39, 40, 48.5 R, 48.5 A, 49; 74/813 R, 813 L, 813 C, 816, 817, 825, 826

[56] References Cited

U.S. PATENT DOCUMENTS

| | | | |
|---|---|---|---|
| 1,915,375 | 6/1933 | Mobius | 29/46 |
| 2,735,161 | 2/1956 | Pulman | 29/44 |
| 2,748,451 | 6/1956 | Pulman | 29/46 |
| 2,959,065 | 11/1960 | Musser | 74/813 R |
| 3,786,539 | 1/1974 | Foll et al. | 29/36 |
| 4,080,853 | 3/1978 | Goto | 29/36 |
| 4,644,825 | 2/1987 | Yamazaki | 74/813 R |

FOREIGN PATENT DOCUMENTS

| | | | |
|---|---|---|---|
| 2930965 | 2/1981 | Fed. Rep. of Germany | 82/36 A |
| 114648 | 9/1981 | Japan | 74/813 C |
| 496159 | 3/1976 | U.S.S.R. | 74/813 C |

*Primary Examiner*—Frederick R. Schmidt
*Assistant Examiner*—William E. Terrell
*Attorney, Agent, or Firm*—Schlesinger, Arkwright & Garvey

[57] ABSTRACT

A compound turret for machine tools such as latches or the like having rotating and non-rotating tooling turrets mounted on a single housing. The compound turret includes a primary drive and a secondary drive. The primary drive includes a compound turret indexing unit operable to index the rotating and non-rotating tooling turrets into the turret operating and turret storage positions. The compound turret indexing unit consists of a harmonic drive that enables the operator to incrementally vary the turret operating position. The harmonic drive achieves high reduction ratios in a single stage thus eliminating the cumbersome gear systems usually implemented to achieve the reduction ratios required. The primary drive further includes a non-rotating tool indexing unit. The non-rotating tool indexing unit is operable to index the non-rotating tooling. The non-rotating tool indexing unit consists of a harmonic drive unit similar to the compound turret indexing unit. The primary drive further includes a drive connection for driving the rotating tooling mounted on the rotating tooling turret. The secondary drive includes a rotating tool indexing unit. The rotating tool indexing unit includes a motor divingly connected to a worm gear in constant meshing engagement with a worm wheel. The worm wheel is operably connected to the rotating tooling plate for indexing the tooling mounted thereon. In addition to indexing the rotating tooling, the worm gear and worm wheel drive connection enable the operator to perform offcenter machining. This is accomplished by simultaneously rotating the rotating tooling turret, via the worm gear and worm wheel, and the main spindle upon which the work piece is mounted.

21 Claims, 5 Drawing Sheets

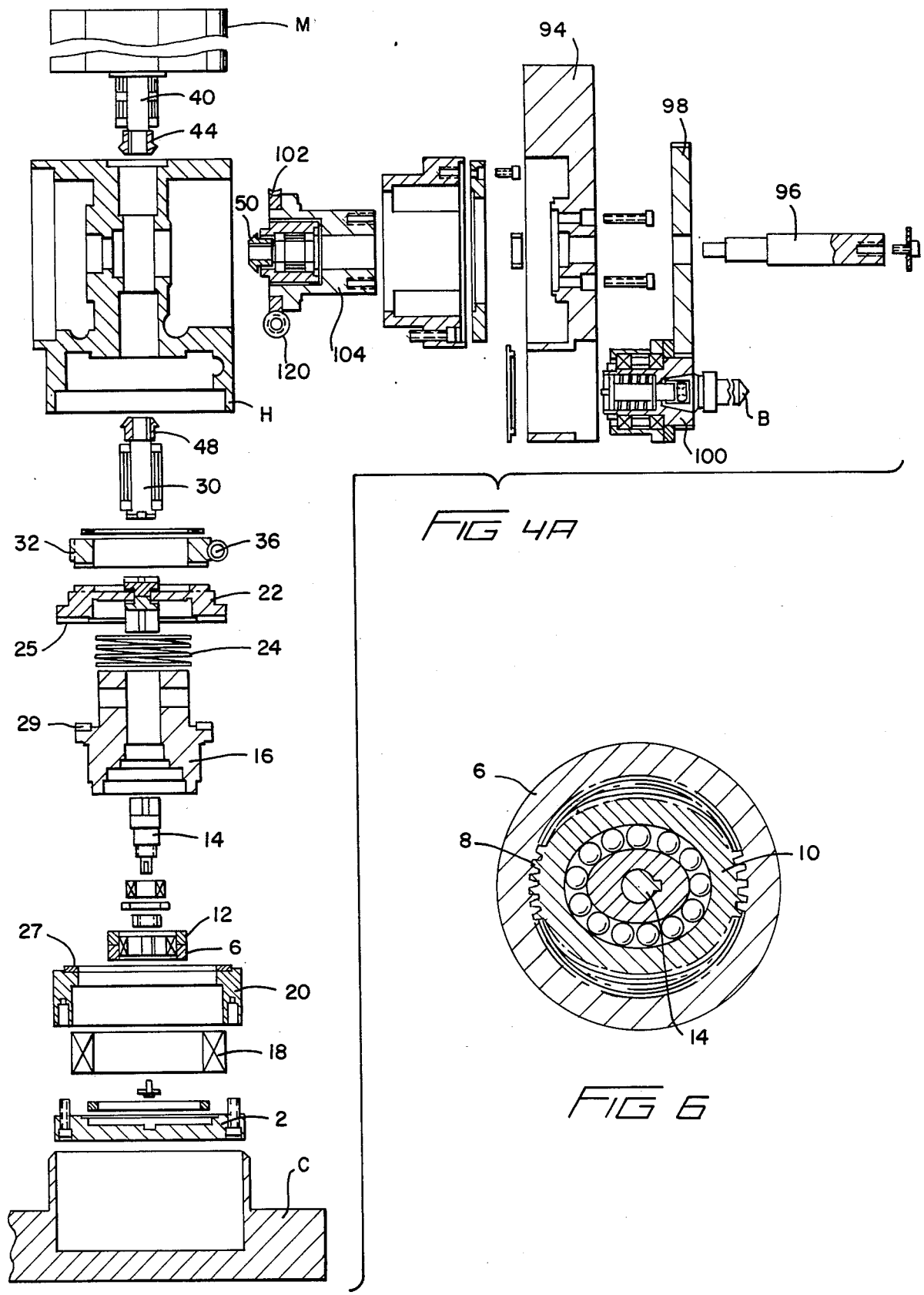

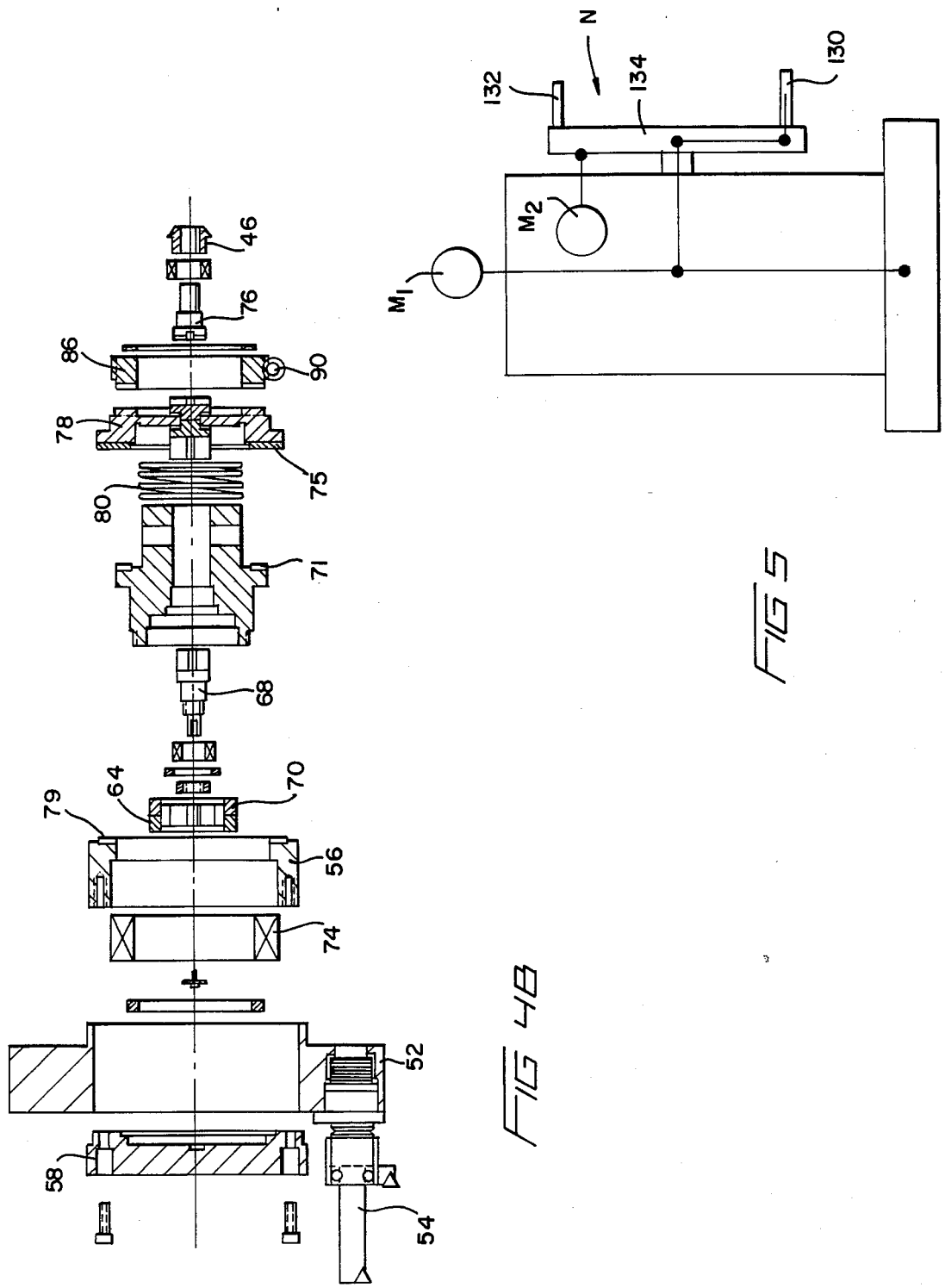

TURRET HAVING ROTATING AND NON-ROTATING TOOLING

FIELD OF THE INVENTION

This invention relates to a compound turret for machine tools such as lathes or the like and more particularly to a compound turret having rotating and non-rotating tooling turrets mounted on a single housing.

BACKGROUND OF THE INVENTION

The use of a compound turret having a rotary turret and a stationary turret mounted on a single housing in conjunction with machine tools such as lathes or the like is shown by Goto in U.S. Pat. No. 4,080,853. Further, the use of carriage systems for linearly varying the position of said turrets with respect to a work piece is disclosed by Williamson et al in U.S. Pat. No. 3,710,466, Kurimoto et al in U.S. Pat. No. 3,725,987 and Goto in U.S. Pat. No. 4,080,853. Prior to this invention, however, it has not been possible to vary the angular position that either turret of a compound turret forms with respect to a work piece. Thus, the functions that tooling mounted on the turrets could, perform were severely limited.

Prior drive systems used for indexing rotary and non-rotary turrets mounted on a single housing have been costly and ineffective. Such drive systems were exemplified by that employed by Goto in U.S. Pat. No. 4,080,853.

The use of a plurality of tools mounted on a single turret is disclosed by Goto in U.S. Pat. No. 4,080,853, Foll et al in U.S. Pat. No. 3,786,539 and in Japanese Pat. No. 56119302. This feature allows the operator to readily index another tool to perform a different machining function or to readily replace a dull tool. Prior to this invention, it has not been known to place a rotating and non-rotating dead tool on a single turret plate.

OBJECTS AND SUMMARY OF THE INVENTION

An object of the present invention is to provide a compound turret for machine tools such a lathes or the like having rotating and stationary turrets mounted on a single turret in a work position.

Another object of the invention is to provide indexing means capable of incrementally varying the angular position the stationary turret and infinitly varying the operating position the rotary turret forms with the work piece.

Yet another object of the invention is to provide an indexing means capable of incrementally varying the operating position of tooling mounted on the dead turret.

A further object of the invention is to provide a compound turret with a dual power source mounted thereon for selective indexing of one or more of other turrets.

Still another object of the invention is to provide the turret indexing means and tool indexing means with a drive unit capable of achieving reduction ratios from 60:1 to 320:1. The particular drive unit employed by this invention eliminates the cumbersome gearing arrangement necessary to achieve the desired reduction ratios.

Yet another object of this invention is to provide rotating and non-rotating tooling on a single turret plate.

A further object of the invention is to arrange the motors on the compound turret's housing in such a manner as to simplify the drive paths.

Still a further object of the invention is to provide a compound turret that can be easily assembled and that provides a high degree of accuracy.

A further object of the invention is to provide a single power source for rotating the compound turret about its x-axis and for rotating tooling about an axis transverse to said x-axis.

Yet another object of the invention is to mount a power source on the top of the compound turret and a second power source on the side of the compound turret.

Still a further object of the invention is to design a compound turret that will prevent work particles from entering the turret and thereby eliminating possible malfunctions attributable to foreign particles in the drive system.

Yet another object of the invention is to provide a rotating tool indexing means comprising a worm and worm wheel that operates to provide a positive position thus minimizing back-lash and resulting in a significant improvement in the compound turret's overall accuracy.

A further object of the invention is to provide a rotating tool indexing means comprising a worm and worm wheel that enables the operator to perform off center machining.

In summary, the present invention comprises a compound turret having rotary and stationary turrets.

These and other objects and advantages of the invention will be rapidly apparent in view of the following description and drawings of the above-described invention.

DESCRIPTION OF THE DRAWINGS

FIGS. 4A and B are exploded views of the compound turret.

FIG. 5 is an elevational view of the second embodiment of the invention.

FIG. 6 is a cross-sectional view taken along lines 6—6 in FIG. 1 and viewed in the direction of the arrows of the compound turret's harmonic drive unit.

DETAILED DESCRIPTION OF THE INVENTION

Figure 1:
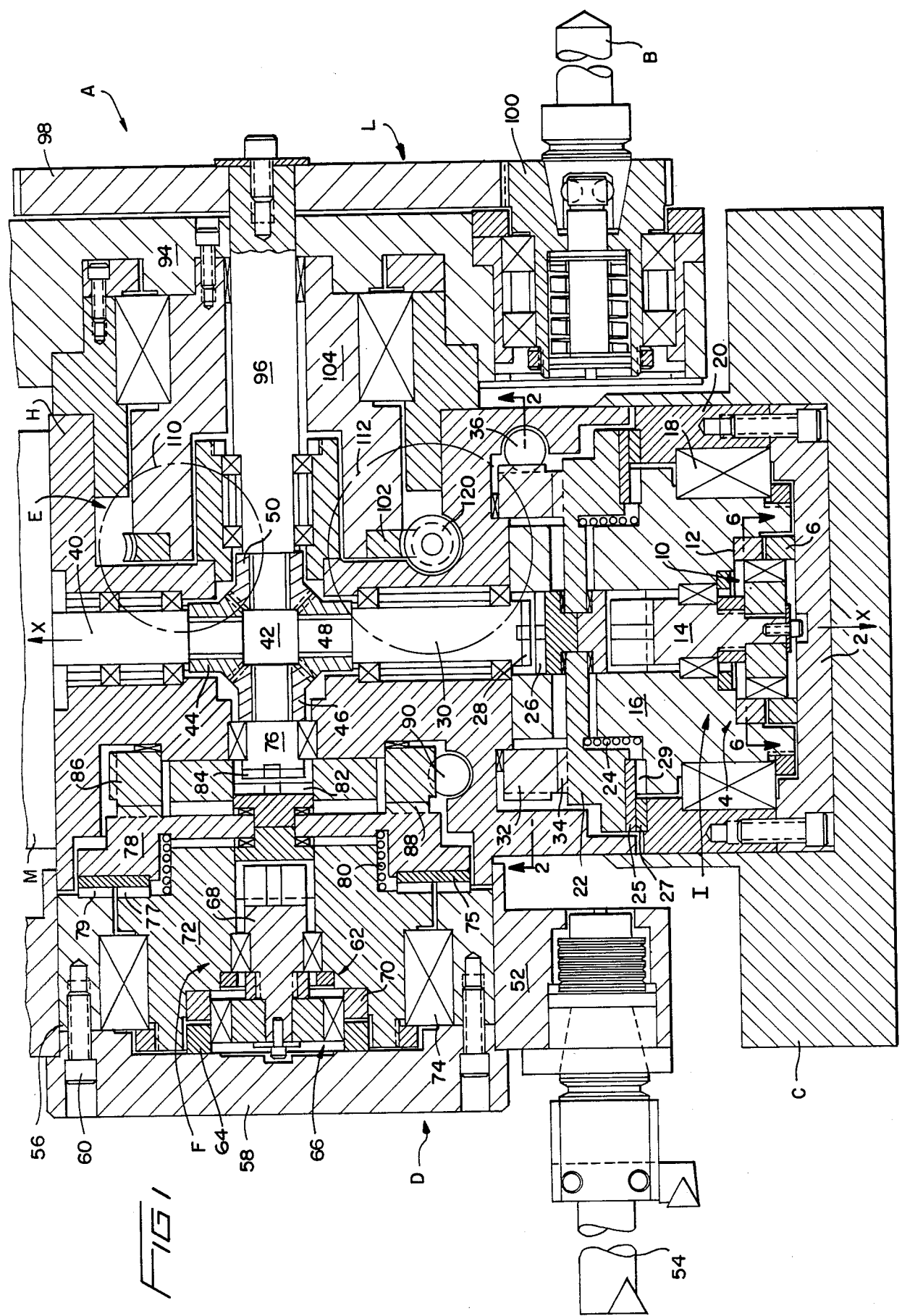
FIG. 1 is a fragmentary elevational view of the compound turret.
Figure 2:
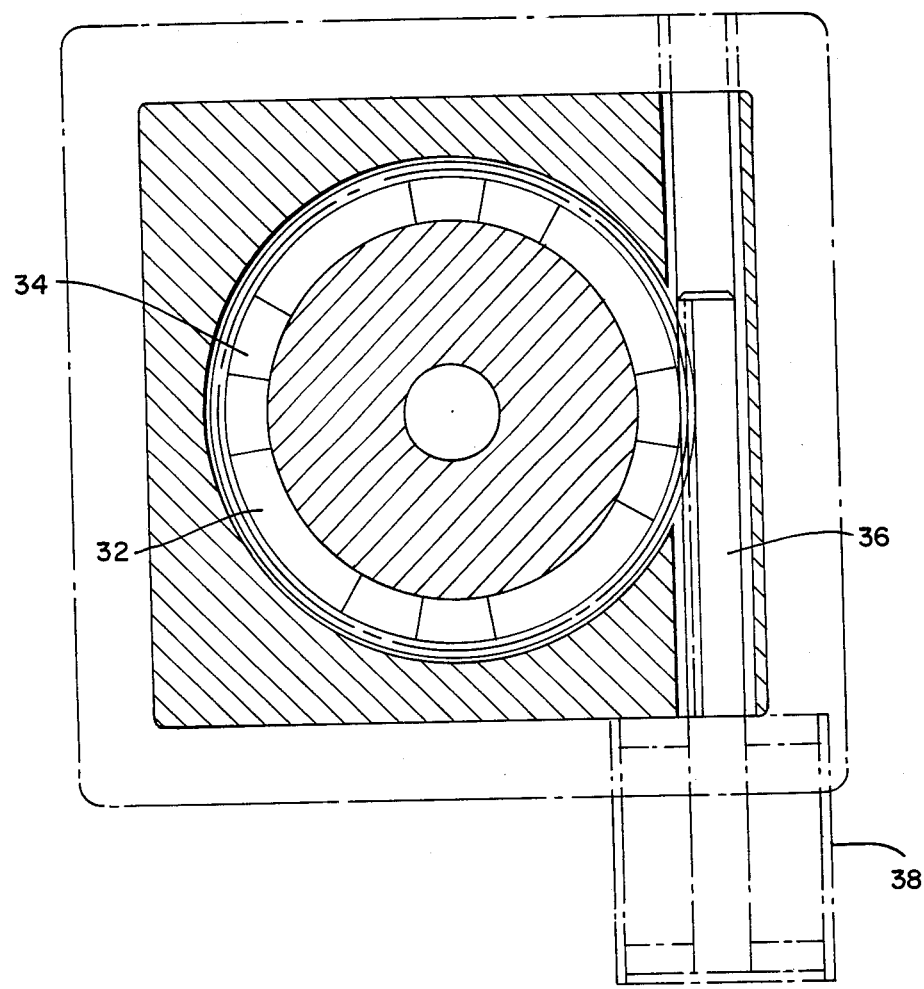
FIG. 2 is a cross-sectional view taken along lines 2—2 in FIG. 1 and viewed in the direction of the arrows.

FIGS. 1, 2 and 5

The compound turret A comprises a base 2 mounted on carriage C. A turret indexing unit I is rotatably supported on base 2. Turret indexing unit I operates to index the rotary turret L and the stationary turret D into turret operating and turret storage positions. The turret indexing unit I includes a harmonic drive unit 4 having a circular spline 6 fixed to base 2, a flexspline 8, best seen in FIG. 6, supported on a wave generator 10 and an output spline 12 in meshing engagement with flexspline 8. The wave generator 10 of the harmonic drive unit is drivingly connected to shaft 14. The output element of the harmonic drive unit 12 is fixed to sleeve 16. The sleeve 16 is rotatably supported on bearing 18. Fixed to base 2 is a bearing support sleeve 20.

Slip coupling 22 operates to disengage and engage turret indexing unit I with motor M, partially shown in FIG. 1. Compression spring 24 biases teeth 26 into engagement with teeth 28 of intermediate shaft 30. A pinion 32, as best seen in FIG. 2, has a plurality of cams 34 circumferentially mounted thereon. Cams 34 urge slip coupling 22 out of engagement with intermediate shaft 30. Rack 36 has teeth formed thereon in meshing engagement with teeth on the outer circumference of pinion 32. Rack 36 is linearly displaced by hydraulic actuator 38. Intermediate shaft 30 is drivingly connected to output shaft 40 by way of cruciform beveled gear system 42. The cruciform bevel gear system includes four beveled gears 44, 46, 48 and 50.

The stationary turret D is mounted on housing H. The stationary turret D includes a turret plate 52 having a plurality of non-rotating tools 54 mounted thereon. A bearing support sleeve 56 is fixed to turret tooling plate 52. The turret cover plate 58 is secured to bearing support 56 by fasteners 60.

A non-rotating tool indexing unit F operates to index tooling munted on the stationary turret into tool operating and tool storage positions. The indexing unit includes a harmonic drive 62 similar to that disclosed in the turret indexing unit I. The output spline 64 of the harmonic drive is fixed to turret cover plate 58. The wave generator 66 is drivingly connected to shaft 68. Circular spline 70 is fixed to sleeve 72. Sleeve 72 is rotatably supported by bearings 74.

The indexing unit F is disengaged and engaged from motor M by slip coupling 78. Spring 80 acts to bias teeth 82 of slip coupling 78 into engagement with teeth 84 of intermediate shaft 76.

A pinion 86 has a plurality of cams 88 circumferentially mounted thereon. Cams 88 operate to hold slip coupling 78 out of engagement with intermediate shaft 76. A rack 90 has a plurality of teeth formed thereon in meshing engagement with teeth formed on the outer circumference of pinion 86. The movement of rack 90 is controlled by a hydraulic actuator (not shown).

Rotating tooling turret L is rotatably mounted on housing H. A plurality of rotating tools B are mounted on tool plate 94. Rotating tool drive shaft 96 has a gear 98 fixed thereto. Shaft 96 is drivingly connected to output shaft 40 of motor M through the cruciformed beveled gear system 42. Gear 98 is in meshinq engagement with tool drive 100.

Figure 3:
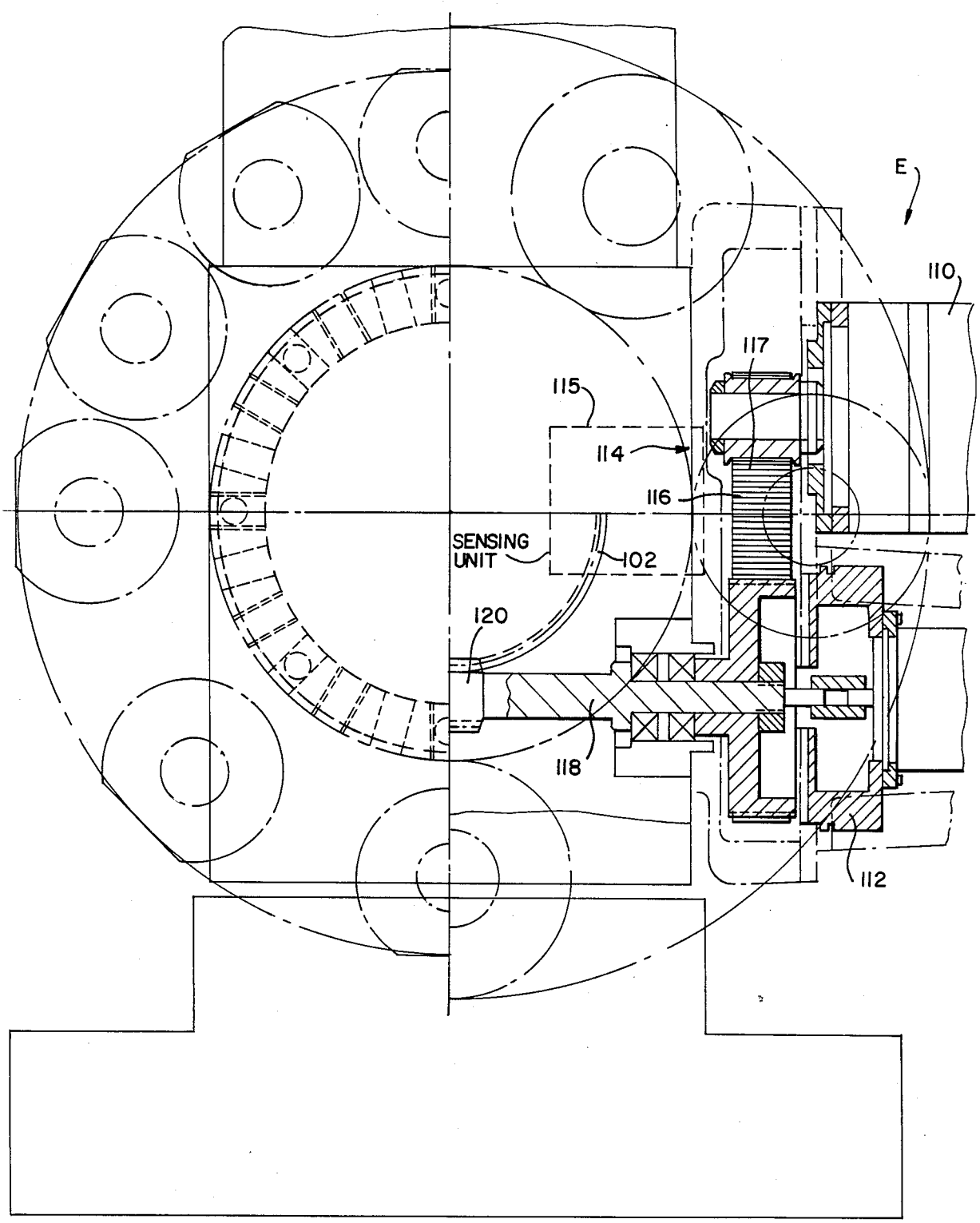
FIG. 3 is a fragmentary side elevational view of the compound turret, a portion of which is shown in cross-section and broken lines.

FIGS. 1 and 3

Tooling mounted on the rotating turret L are indexed by rotating tool indexing unit E, best seen in FIG. 3. The indexing unit E is mounted on housing H. The indexing unit E includes a motor 110 which drives output shaft 118 of tachometer 112 through pulley system 114. Worm 120, fixed to shaft 118, is in constant meshing engagement with worm wheel 102. Worm wheel 102 is fixed to sleeve 104 which in turn is rotatably mounted on tool drive shaft 96. Sleeve 104 is fixed to tool plate 94.

A sensor 115 of the type well known in the art allows the operator to determine the exact position of rotating tools B and thus enables the operator to position te tools in the appropriate manner for the desired machining process. The sensor 115 reads timing/pulley belt 116 having timing marks 117 and feeds back the appropriate position signals.

FIG. 5

A second embodiment of the invention is shown in FIG. 5. This embodiment has only a single turret N. Rotating and non-rotating tooling 130 and 132 respectively are mounted on plate 134 of the turret. The turret N is indexed from a turret storage to a turret operating position by motor $M_1$, in the same manner as the compound turret A shown in FIG. 1. The tooling mounted on plate 134 are indexed by motor $M_2$, in the same manner as rotating tooling L mounted on tool plate 94 of compound turret A. Rotating tooling 130 is driven by motor $M_1$ through a drive connection similar to that of compound turret A shown in FIG. 1. Non-rotating tooling 132 are positioned adjacent but are not in meshing engagement with the drive connection.

OPERATION

FIGS. 1 and 3

In operation, the compound turret A works as follows. The motors M and 110 and both hydraulic actuators are controlled by an electronic control unit (not shown) of the type well known in the art. As seen in FIG. 1, the non-rotating tooling turret D is presently in the turret operating position. If the operator desires to index the compound turret A such that the rotating turret L is in the operating position, the motor M must be coupled to turret indexing unit I. The specific steps taken to achieve this drive connection are set forth below.

The actuator 38 is energized through the electronic control unit thus causing pinion 32 to rotate. Cams 34 are accordingly rotated out of abutting engagement with slip coupling 22. Spring 24, therefore, acts to bias slip coupling 22 into engagement with intermediate shaft 30. The operator will then energize motor M through the electronic control unit. The output shaft 40 will drive intermediate shaft 30 which will in turn impart drive to cutput shaft 14 of the turret indexing unit I through coupling 22.

The turret indexing unit I includes a harmonic drive 4 which operates to index the rotary and stationary turrets L and D into turret operating and turret storage position. The input shaft 14 drives wave generator 10. The flexspline 8 mounted on wave generator 10 drives output member 12 which is fixed to sleeve 16. Sleeve 16 is fixed to housing H and thus rotates housing H about its x-axis. This will result in the indexing of rotating turret L to the turret operating position and non-rotating turret D to the turret storage position.

The harmonic drive unit 4 provides high reduction ratios in a single stage. Harmonic drive units are capable of achieving reduction ratios ranging from 60:1 to 320:1 in a single stage. This feature of the harmonic drive unit allows the operator to incrementally rotate the rotating and non-rotating turrets L and D about the compound turret A's x-axis. Thus, the operator can incrementally vary the turret operating position. Accordingly, the operator can vary the angle at which a rotating or non-rotating tool strikes the work piece. The specifics of the harmonic drive unit 4 which enables it to achieve the high reduction ratios set forth above are fully explained in the article *Harmonic Drives for Servomechanisms*, John H. Carlson, Chief Engineer, Harmonic Drive Division, Emhart Machinery Group, Wakefield, Mass., C 1985 by Penton/IPC. Inc. and is herein incorporated by reference.

When either the rotating or non-rotating turret L and D is presented in the desired position, the operator through the electronic control unit energizes the hydraulic actuator 38 causing cams 34 to rotate into abutting engagement with slip coupling 26. The turret indexing unit I is thereby disengaged from the motor M. The teeth 25 on the outer portion of slip coupling 26 engage with teeth 27 formed on the bearing support sleeve 20 and teeth 29 on sleeve 16. This meshing engagement operates to secure the housing H in a fixed position thus preventing angular movement about the x-axis of either turret when in the operating position.

Operation of Stationary Tool Indexing Unit

The operation of the non-rotating tool indexing unit F is as follows. The non-rotating tool indexing unit F is coupled and uncoupled to the motor M by slip coupling 78 in the same manner as is turret indexing unit I. Once shaft 68 is coupled to intermediate shaft 76, a drive is imparted to wave generator 66. A flexspline mounted on the wave generator 66 drives output spline 64. Circular spline 70 is fixed to sleeve 72. Circular spline 70 is fixed with respect to rotation of wave generator 66. The output spline 64 is fixed to turret cover plate 58 which in turn is fixed to tooling plate 52. Thus, upon rotation of output spline 64, the turret tooling plate 52 is rotated. Once the operator has positioned the appropriate non-rotating tool D in the tool operating position, as can be seen in FIG. 1, the hydraulic actuator will be energized in such a manner to disengage the slip coupling 78 from intermediate shaft 76. Cams 88 mounted on pinion 86 will act to engage teeth 75 on the outer portion of slip coupling 78 with teeth 77 on the outer portion of sleeve 72 and teeth 79 on bearing support 56. It is readily apparent from the above description that the harmonic drive unit 62 will enable the operator to incrementally vary the tool operating position. The operator can thus vary the position that the non-rotating tool D strikes the work piece.

It should be noted that the harmonic drives units E and F are not in any way used to index the rotating tools mounted on the rotating tooling turret L. The manner in which the rotating tooling mounted on rotating tooling turret L are indexed is fully described below.

FIG. 2

Operation of Rotating Tool Indexing Unit

The operation of the rotating tool indexing unit E is as follows. Motor 110 drives the output shaft 118 and worm gear 120 through pulley arrangement 114. Worm 120 is in meshing engagement with worm wheel 102. When the operator desires to index rotating tooling mounted on the rotating tooling turret L, the electronic control unit energizes motor 110 which imparts the drive through worm 120 to worm wheel 102 and sleeve 104 affixed thereto resulting in the rotation of tool plate 94. When the tooling is presented in the desired tool operating position, the operator denergizes motor 110.

The timing belt 116 has a plurality of timing marks 117 formed therein. Sensing means 115 feeds back to the electronic control unit the appropriate position signals. Thus, the operator can readily obtain the exact positions of the tools mounted on the live tool plate 94.

In addition to indexing the rotating tools, the worm 120 and worm wheel 102 driven by motor 110 through pulley arrangement 114 enables the operator to achieve off-center machining. This is accomplished by simultaneously rotating the rotating tooling turret by way of worm 120 and worm wheel 102 and the main spindle (not shown) upon which the work piece is mounted. Thus, the rotating tooling mounted on the turret L is revolving in a plane transverse to the x-axis while in abutting contact with the work piece which is similarly revolving in a plane transverse to the x-axis. In this manner, the operator can obtain off-center machining.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

We claim:

1. A compound turret for machine tooling, comprising:
   (a) a first turret having non-rotating tooling;
   (b) a second turret having rotating tooling;
   (c) a housing operably associated with said first and second turrets;
   (d) a base having an x-axis;
   (e) means for rotatably mounting said housing on said base;
   (f) said first and second turrets each having turret storage and turret operating positions;
   (g) first, second and third indexing means;
   (h) said first indexing means including means for rotating said first and second turrets about said x-axis between said turret storage positions and said turret operating positions;
   (i) said second indexing means operably associated with said first turret for rotating said first turret about an axis transverse to said x-axis for selecting tooling positioned on said first turret for specific work operations;
   (j) said third indexing means operably associated with said second turret for rotating said second turret about an axis transverse to said x-axis for selecting tooling mounted on said second turret for specific work operations;
   (k) a first drive means for driving said first indexing means, said second indexing means and said rotating tooling; and
   (l) a second drive means for driving said third indexing means.

2. A compound turret as in claim 1, wherein:
   (a) said first drive means includes an output shaft extending therefrom; and
   (b) said drive means includes a cruciform beveled gear system having four beveled gears drivingly connected to said output shaft.

3. A compound turret as in claim 2, wherein:
   (a) said first drive means includes a first connecting means for connecting and disconnecting said first indexing means to said cruciform beveled gear system; and
   (b) said first connecting means includes a slip coupling and an actuating means for moving said slip coupling between first and second positions wherein when said slip coupling is in said first position said first indexing means is connected to said cruciform beveled gear system and when in said second position said first indexing means is disconnected from said cruciform beveled gear system.

4. A compound turret as in claim 3, wherein;
(a) said actuating means includes a rack and pinion;
(b) said pinion includes at least a first face; and
(c) at least a first cam means mounted on said first face of said pinion for biasing said slip coupling into said second position.

5. A compound turret as in claim 4, wherein;
(a) said actuating means includes spring means for biasing said slip coupling into said first position.

6. A compound turret as in claim 5, wherein:
(a) said actuating means includes means for displacing said rack whereby upon movement of said rack said pinion rotates thereby engaging and disengaging said cam means from said slip coupling.

7. A compound turret as in claim 2, wherein:
(a) said first drive means includes a second connecting means for connecting said rotating tooling to said cruciform beveled gear system;
(b) said second connecting means includes an intermediate shaft;
(c) said means for rotating tooling includes gear means operably associated with said tooling of said second turret; and
(d) said intermediate shaft includes first and second ends; said first end is connected to said cruciform beveled gear system and said second end is connected to said gear means.

8. A compound turret for machine tooling, as in claim 2, wherein:
(a) said first drive means includes a third connecting means for connecting and disconnecting said second indexing means to said cruciform beveled gear system; and
(b) said third connecting means includes a slip coupling and actuating means for moving said slip coupling between first and second positions wherein when said slip coupling is in said first position said second indexing means is connected to said cruciform beveled system and when in said second position said second indexing means is disconnected from said cruciform beveled gear system.

9. A compound turret for machine tooling, as in claim 1, wherein:
(a) said first indexing means includes means for incrementaly rotating said first turret and said second turret about said x-axis.

10. A compound turret for machine tooling, as in claim 1, wherein:
(a) said second indexing means includes means for incrementaly varying an operating position of said first turret with respect to a work piece.

11. A compound turret for machine tooling, as in claim 1, wherein:
(a) said third indexing means includes means for infinitely varying an operating position of said second turret with respect to a work piece.

12. A compound turret for machine tooling, as in claim 1, and further Comprising:
(a) means operably associated with said second turret for permitting off-center machining.

13. A compound turret for machine tooling, as in claim 12, wherein:
(a) said means for off-center machining includes a worm and a worm wheel.

14. A compound turret for machine tooling, as in claim 1, wherein:
(a) said first drive means is mounted on said housing.

15. A compound turret for machine tooling, as in claim 14, wherein:
(a) said first drive means is mounted on top of said housing.

16. A compound turret for machine tooling, as in claim 14, wherein:
(a) said second drive means is mounted on said housing.

17. A compound turret for machine tooling, as in claim 16, wherein:
(a) said second drive means is mounted on a side of said housing.

18. A compound turret for machine tooling, as in claim 17, wherein:
(a) said second drive means is mounted intermediate said first turret and said second turret.

19. A compound turret for machine tooling, as in claim 18, wherein:
(a) each of said first drive means and said second drive means include a drive shaft; and
(b) said drive shat of said second drive means is off-set from said drive shaft of said first drive means.

20. A compound turret for machine tooling, as in claim 19, wherein:
(a) said drive shafts are positioned transverse to each other.

21. A compound turret for machine tooling, as in claim 1, and further comprising:
(a) means for engaging and disengaging said first and second indexing means.

* * * * *